United States Patent
Schmitz

(10) Patent No.: US 9,243,151 B2
(45) Date of Patent: Jan. 26, 2016

(54) AFTERGLOW COATING FOR CABINS

(75) Inventor: Guenter Schmitz, Jesteburg (DE)

(73) Assignee: Airbus Operations GmbH (DE)

( * ) Notice: Subject to any disclaimer, the term of this patent is extended or adjusted under 35 U.S.C. 154(b) by 329 days.

(21) Appl. No.: 12/936,057

(22) PCT Filed: Feb. 17, 2009

(86) PCT No.: PCT/EP2009/051833
§ 371 (c)(1),
(2), (4) Date: Oct. 1, 2010

(87) PCT Pub. No.: WO2009/121659
PCT Pub. Date: Oct. 8, 2009

(65) Prior Publication Data
US 2011/0033690 A1   Feb. 10, 2011

Related U.S. Application Data

(60) Provisional application No. 61/123,012, filed on Apr. 4, 2008.

(30) Foreign Application Priority Data

Apr. 4, 2008 (DE) .......................... 10 2008 017 356

(51) Int. Cl.
| | | |
|---|---|---|
| C09K 11/02 | (2006.01) | |
| B32B 27/38 | (2006.01) | |
| B05D 3/10 | (2006.01) | |
| B32B 27/08 | (2006.01) | |
| B32B 15/092 | (2006.01) | |
| B32B 17/10 | (2006.01) | |
| B32B 18/00 | (2006.01) | |
| B32B 21/08 | (2006.01) | |
| C09D 7/12 | (2006.01) | |
| C09D 5/22 | (2006.01) | |
| C09K 11/77 | (2006.01) | |
| C04B 35/44 | (2006.01) | |
| C08K 3/00 | (2006.01) | |

(52) U.S. Cl.
CPC .............. *C09D 7/1216* (2013.01); *C04B 35/44* (2013.01); *C09D 5/22* (2013.01); *C09D 7/1283* (2013.01); *C09K 11/02* (2013.01); *C09K 11/7706* (2013.01); *C09K 11/7734* (2013.01); *C09K 11/7792* (2013.01); *C04B 2235/3206* (2013.01); *C04B 2235/3208* (2013.01); *C04B 2235/3213* (2013.01); *C04B 2235/3215* (2013.01); *C04B 2235/3224* (2013.01); *C04B 2235/76* (2013.01); *C08K 3/0075* (2013.01); *Y10T 428/31511* (2015.04); *Y10T 428/31525* (2015.04); *Y10T 428/31529* (2015.04)

(58) Field of Classification Search
USPC ............ 428/220, 413, 417, 418; 252/301.36; 427/157
See application file for complete search history.

(56) References Cited

U.S. PATENT DOCUMENTS

| | | | |
|---|---|---|---|
| 2,375,177 A | 5/1945 | Reese | |
| 4,675,234 A | 6/1987 | Sachs et al. | |
| 5,356,669 A | 10/1994 | Rehfuss et al. | |
| 5,424,006 A | 6/1995 | Murayama et al. | |
| 5,474,811 A | 12/1995 | Rehfuss et al. | |
| 5,605,965 A | 2/1997 | Rehfuss et al. | |
| 5,665,793 A | 9/1997 | Anders | |
| 6,180,180 B1 | 1/2001 | Hintze-Bruning et al. | |
| 6,234,645 B1 * | 5/2001 | Borner et al. | 362/231 |
| 6,342,274 B1 | 1/2002 | Schwarte et al. | |
| 6,419,989 B1 | 7/2002 | Betz et al. | |
| 6,512,026 B1 | 1/2003 | Ott et al. | |
| 8,123,980 B2 * | 2/2012 | Kijima et al. | 252/301.4 F |
| 2002/0017651 A1 * | 2/2002 | Kato et al. | 257/89 |
| 2003/0039820 A1 * | 2/2003 | Hall et al. | 428/325 |
| 2003/0153662 A1 | 8/2003 | Lassman et al. | |
| 2003/0160560 A1 | 8/2003 | Bolta et al. | |
| 2004/0058083 A1 | 3/2004 | Lettmann et al. | |
| 2004/0101629 A1 | 5/2004 | Baumgart et al. | |
| 2005/0072338 A1 | 4/2005 | Weintz et al. | |
| 2005/0212397 A1 * | 9/2005 | Murazaki et al. | 313/487 |
| 2005/0223945 A1 | 10/2005 | Baumgart et al. | |
| 2005/0247951 A1 * | 11/2005 | Lin et al. | 257/100 |
| 2005/0247953 A1 * | 11/2005 | Lin et al. | 257/103 |
| 2006/0006797 A1 * | 1/2006 | Ito et al. | 313/506 |
| 2006/0227532 A1 * | 10/2006 | Ko et al. | 362/85 |
| 2007/0241657 A1 * | 10/2007 | Radkov et al. | 313/483 |
| 2008/0149893 A1 * | 6/2008 | Chen et al. | 252/301.4 S |

(Continued)

FOREIGN PATENT DOCUMENTS

| | | |
|---|---|---|
| CA | 2110037 A1 | 12/1992 |
| CA | 2079498 A1 | 4/1993 |

(Continued)

OTHER PUBLICATIONS

LumiNovaG series: http://www.nemoto.co.jp/en/products/luminova/pdf (lumonova-G. pdf).

(Continued)

*Primary Examiner* — Tahseen N Khan
(74) *Attorney, Agent, or Firm* — Lerner, David, Littenberg, Krumholz & Mentlik, LLP

(57) ABSTRACT

The present invention relates to an afterglow coating comprising a clear varnish and a photoluminescent pigment, wherein the pigment comprises a white luminous color in which the clear varnish is distributed. The present invention furthermore relates to methods for producing these coatings and to their use for coating surfaces in the cabin of aircraft.

12 Claims, No Drawings

(56) References Cited

U.S. PATENT DOCUMENTS

| | | | | |
|---|---|---|---|---|
| 2009/0229510 | A1* | 9/2009 | Sutter | 116/209 |
| 2012/0267997 | A1* | 10/2012 | Kijima et al. | 313/498 |

FOREIGN PATENT DOCUMENTS

| | | | |
|---|---|---|---|
| CA | 2138041 | A1 | 1/1994 |
| CA | 2129810 | A1 | 2/1995 |
| CA | 2389332 | A1 | 5/2001 |
| CA | 2646561 | A1 | 10/2007 |
| DE | 9301866 | U1 | 4/1993 |
| DE | 4204518 | A1 | 8/1993 |
| DE | 4222194 | A1 | 1/1994 |
| DE | 4326670 | A1 | 2/1995 |
| DE | 19611646 | A1 | 10/1997 |
| DE | 19717963 | C1 | 10/1998 |
| DE | 19744561 | A1 | 4/1999 |
| DE | 19858175 | A1 | 7/1999 |
| DE | 19901118 | A1 | 8/1999 |
| DE | 19841408 | A1 | 3/2000 |
| DE | 19843581 | A1 | 3/2000 |
| DE | 10027290 | A1 | 12/2001 |
| DE | 10121596 | A1 | 12/2001 |
| DE | 10048670 | A1 | 4/2002 |
| DE | 10053931 | A1 | 5/2002 |
| DE | 10055549 | A1 | 5/2002 |
| DE | 10114432 | A1 | 10/2002 |
| DE | 10249916 | A1 | 5/2004 |
| DE | 19953203 | A1 | 12/2007 |
| EP | 0540884 | A1 | 5/1993 |
| EP | 0568967 | A2 | 11/1993 |
| EP | 0594069 | A1 | 4/1994 |
| EP | 0594071 | A1 | 4/1994 |
| EP | 0594142 | A1 | 4/1994 |
| EP | 0604992 | A1 | 7/1994 |
| EP | 0666779 | A1 | 8/1995 |
| EP | 1017750 | A1 | 7/2000 |
| EP | 1119592 | A1 | 8/2001 |
| EP | 1279716 | A1 | 1/2003 |
| EP | 1845507 | A1 * | 10/2007 |
| JP | 09279062 | A | 10/1997 |
| WO | 9222615 | A1 | 12/1992 |
| WO | 9410211 | A1 | 5/1994 |
| WO | 9410212 | A1 | 5/1994 |
| WO | 9410213 | A1 | 5/1994 |
| WO | 2001092426 | A1 | 12/2001 |
| WO | 2006029100 | A1 | 3/2006 |
| WO | 2007056820 | A1 | 5/2007 |
| WO | WO 2007056820 | A1 * | 5/2007 |
| WO | 2007118641 | A1 | 10/2007 |

OTHER PUBLICATIONS

LumiNova VB series: http://www.nemoto.co.jp/en/products/luminova/pdf (lumonova-VB. pdf).

LumiNovaBG series: http://www.nemoto.co.jp/en/products/luminova/pdf (lumonova-BG.pdf).

LumiNovaG series: http://www.nemoto.co.jp/eniproducts/luminova/pdf (lumonova-G. pdf).

LumiNova VB series: http://www.nemoto.co.jp/eniproducts/luminova/pdf (lumonova-VB. pdf).

LumiNovaBG series: http://www.nemoto.co.jp/eniproducts/luminova!pdf (lumonova-BG.pdf).

* cited by examiner

AFTERGLOW COATING FOR CABINS

CROSS-REFERENCE TO RELATED APPLICATIONS

The present application is a national phase entry under 35 U.S.C. §371 of International Application No. PCT/EP2009/051833 filed on Feb. 17, 2009, published in German, which claims the benefit of the filing date of U.S. Provisional Patent Application No. 61/123,012, filed Apr. 4, 2008 and of German Patent Application No. 10 2008 017 356.8 filed Apr. 4, 2008, all of which are incorporated herein by reference.

The present invention relates to an afterglow coating. The present invention furthermore relates to methods for producing these coatings and their use for coating surfaces in the cabins of aircraft.

The use of afterglow substances is presently very common, for example in the area of safety. Afterglow substances comprise photoluminescent or phosphorescent materials and can be excited by natural or artificial light, can absorb part of the light, and can store this energy. After completion of excitation, these substances themselves can then emit light for a certain period of time, wherein, depending on the photoluminescent material, the visually discernible afterglow can last several minutes to several hours after removal of the source of excitation. These substances can be activated without any limitations, as a result of which the effect can be repeated as often as desired. These photoluminescent materials can thus provide a source of light even in darkness, for example in the case of a power failure, and can, for example, mark escape routes and emergency exits.

WO 2007/118641 describes strip-shaped or batten-shaped floor markings for means of transport with a photoluminescent layer. DE 10114432 A1 describes escape route markings in transport tunnels in which a colour system that comprises at least one afterglow pigment is applied to a support surface.

It is thus an object of the present invention to provide an afterglow coating that provides adequate luminosity after removal of a source of excitation, e.g. after a failure of the illumination or after deliberate switching-off of the illumination. It is a further object of the invention for the coating to be white. In addition, a further object of the present invention consists of providing an afterglow coating whose afterglow colour is perceived by the human eye as being white. A further object consists of people with visual impairment also being able to perceive the afterglow and thus illumination in the case of a blackout. A further object consists of this afterglow coating being easy to apply and process, and in addition meeting the safety-relevant requirements of the aircraft industry.

These and other objects were met according to the present invention in that a photoluminescent pigment is distributed in a clear varnish, wherein the pigment comprises a white luminous colour. In this application the clear varnish can comprise further common additives, e.g. fillers, plasticisers, flow modifying agents, adhesion improving agents, curing accelerators, antioxidants or light protection agents. This coating can be applied at the desired thickness and concentration on surfaces in the cabins of aircraft.

In contrast to the state of the art, the afterglow coating according to the invention comprises a suitable clear varnish, preferably based on polyurethanes, and a photoluminescent pigment distributed therein, wherein the pigment comprises a white luminous colour. Preferably, the photoluminescent pigment is a phosphorescent pigment.

As a result of the use of photoluminescent pigments with a white luminous colour the afterglow coating according to the invention comprises outstanding photoluminescent characteristics, in particular also without additional extraneous illumination.

These photoluminescent characteristics are reflected in a long afterglow duration, wherein the intensity of the afterglow caused by the coating is maintained even over an extended period of time. The photoluminescent pigments within the afterglow coating can furthermore be activated without any limitations, and the effect of the afterglow can be repeated as often as desired so that additional extraneous illumination, which is expensive and susceptible to malfunction, in the case of a blackout or during deliberate switching-off of the illumination is not necessary because the afterglow coating can act as a light source even in the dark.

In addition, during daylight or with the illumination switched on, in contrast to a green, red or blue colour, the white colour of the coating ensures that the wellbeing of passengers and/or the cabin crew is not negatively affected. In the case of a blackout or deliberate switching-off of the illumination the white afterglow colour of the coating additionally contributes to the environment being almost clear and natural, without causing additional stress that would have a negative effect on the wellbeing of passengers and/or the cabin crew. Accordingly, the afterglow coating according to the invention in the case of a blackout or of deliberate switching-off of the illumination also contributes to the safety of passengers and/or of the cabin crew, because there is less irritation as a result of unnatural colours.

In addition, the white colour of the coating ensures that people with a visual impairment, e.g. colour blindness or colour deficient vision such as red-green colour blindness, in the case of a blackout or deliberate switching-off of the illumination can also perceive the afterglow of the coating according to the invention. This afterglow coating is, furthermore, resistant to high and low temperatures, is not inflammable, resistant to wear and abrasion, and easy to clean.

In an exemplary embodiment of the present invention, the afterglow coating is preferably applied to the entire surface of the interior cabin of an aircraft. A further exemplary embodiment provides the option of applying the afterglow coating only to individual parts of the surface of the cabin of an aircraft, e.g. in order to mark escape routes.

As a clear varnish of the afterglow coating according to the invention, varnishes can be used that are commonly used for coatings. This includes single-component (1K), two-component (2K) or multi-component (3K, 4K) clear varnishes, clear powder varnishes, powder-slurry clear varnishes or UV-curable clear varnishes.

Single-component (1K), two-component (2K) or multi-component (3K, 4K) clear varnishes are, for example, known from patent specifications DE 4204518, DE 19858175, DE 10249916, DE 19717963, DE 10048670, DE 19611646, DE 10055549, DE 4326670 WO 92/22615, WO 94/10211, WO 94/10212, WO 94/10213, EP 0594071, EP 0594142, EP 0594069, EP 0604992, U.S. Pat. No. 5,474,811, U.S. Pat. No. 5,605,965, U.S. Pat. No. 5,356,669. This includes single-component (1K) clear varnishes, for example hydroxyl-group containing binders and crosslinking agents such as blocked polyisocyanates, tris(alkoxycarbonylamino)triazine and/or aminoplast resins, while two-component (2K) or multicomponent (3K, 4K) clear varnishes as essential components can comprise hydroxyl-group containing binders and polyisocyanates as crosslinking agents, which are stored separately until they are used.

Clear powder varnishes are, for example, described in patent specifications DE 19901118, DE 9301866, DE 4222194, EP1017750, EP 0666779, and can, for example as essential components comprise epoxy group containing binders and polycarboxylic acids as crosslinking agents. In contrast to this, clear powder slurry varnishes can comprise clear powder varnishes that are dispersed in an aqueous medium and that are known, for example, from patent specifications DE 10053931, DE 19843581, DE 19953203, DE 19744561, DE 19841408, DE 10027290, EP 1119592, WO 2001/092426. UV-curable clear varnishes are, for example, known from patent specifications EP 0540884, EP0568967, U.S. Pat. No. 4,675,234.

Suitable clear varnishes of the present invention include those varnishes that essentially when subjected to pressure or as a result of high temperatures or low temperatures as occur in the aircraft industry do not melt, deform, dissolve, and in addition are not inflammable. In particular embodiments, clear varnishes made of organic polymers can be used that comprise crosslinked structures. This includes acrylic polymers, modified acrylic polymers, polyesters, polyepoxides, polycarbonates, polyurethanes, polyamides, polyimides, polysiloxanes or mixtures thereof. Furthermore, any clear varnish that forms a sufficiently uniform mixture with the photoluminescent pigment according to the invention can be used to produce the afterglow coating according to the invention. Furthermore, the clear varnish can comprise a gloss, semi-gloss or a matte finish.

Preferably, the clear varnish of the afterglow coating according to the invention comprises polyurethanes that are formed by polyaddition reactions of polyisocyanates with polyols. The clear varnish used in the production of the afterglow coating of the present invention preferably comprises an average molecular weight of <18,000 g/mol, wherein clear varnishes with an average molecular weight of 1,000 to 15,000 g/mol are preferred. Still more preferable are clear varnishes with an average molecular weight of 2,000 to 10,000 g/mol and most preferable are clear varnishes with an average molecular weight of 3,000 to 8,000 g/mol. The clear varnishes can comprise further additives, e.g. fillers, plasticisers, flow modifying agents, adhesion improving agents, hardeners, thinners, antioxidants or light protection agents.

The additives of the afterglow coating according to the invention can, in particular embodiments, be present at a quantity of 0 to 50 per cent by weight, preferably at a quantity of 10 to 40 per cent by weight, in each case relative to the overall weight of the non-cured coating composition.

The clear varnish in the afterglow coating according to the invention can be present at a quantity of 50 to 80 per cent by weight, preferably at a quantity of 55 to 75 per cent by weight and most preferably at a quantity of 65 to 75 per cent by weight, in each case relative to the overall weight of the non-cured coating composition.

A particularly preferred embodiment of the present invention comprises ALEXIT® FST-clear varnish 404-15 of Firma Mankiewicz Gebr. & Co (GmbH & Co. KG) (Germany) as a clear varnish. This colourless two-component (2K) clear varnish, which is based on polyurethane, is a clear varnish that has been approved for use in the aircraft industry; when cured it comprises outstanding chemical and physical characteristics such as good abrasion and wear resistance as well as good resistance to soiling and cleaning agents.

The group of photoluminescent pigments that is preferred to produce the coating according to the invention includes pigments that when excited with visible or ultraviolet radiation produce a photoluminescence effect or phosphorescence effect. This includes such photoluminescent pigments in which in the photoluminescence process energy-saving processes are also involved, and consequently the luminescence is still present, at least in part, after completion of the excitation. Excitation of the photoluminescence effect is possible with natural or with artificial light, so that artificial light, for example from fluorescent tubes or other illumination means, is adequate for excitation, i.e. the emission of photoluminescence or phosphorescence.

In this arrangement, particularly suited as photoluminescent pigments of the present invention are zinc sulphides, zinc cadmium sulphides, alkaline earth aluminates, alkaline earth sulphides or alkaline earth silicates that have been doped with one or several transition metal elements or lanthanoid elements. The photoluminescent pigment is preferably present in powder form.

The photoluminescent pigments that are most preferred in the production of the afterglow coating according to the invention comprise alkaline earth aluminates that have preferably been activated with europium or dysprosium. Exemplary compositions comprise $MeAl_2O_4$:Eu; $MeAl_2O_4$:Dy; $MeAl_2O_4$:Eu,Dy; $MeAl_4O_7$:Eu; $MeAl_4O_7$:Dy; $MeAl_4O_7$:Eu,Dy; $Me_4Al_{14}O_{25}$:Eu; $Me_4Al_{14}O_{25}$:Dy; $Me_4Al_{14}O_{25}$:Eu,Dy or mixtures thereof, wherein Me is represented by an alkaline earth metal selected from the group comprising calcium, magnesium, strontium or barium.

A particularly preferred embodiment of the present invention comprises an alkaline earth aluminate comprising $MeAl_2O_4$:Eu, wherein Me is represented by an alkaline earth metal selected from the group comprising calcium, magnesium, strontium or barium.

A further preferred embodiment of the present invention comprises a mixture of at least two alkaline earth aluminates comprising $MeAl_2O_4$:Eu, wherein in each case Me is represented by an alkaline earth metal selected from the group comprising calcium, magnesium, strontium or barium.

The weight ratios in the mixtures comprising at least two alkaline earth aluminates of the composition of $MeAl_2O_4$:Eu as photoluminescent pigments can vary widely, but they should be at a ratio at which the desired white afterglow is achieved.

A particularly preferred embodiment of the present invention comprises the pigment LL PBL 35-W of the company Longlite Technologies AG (Germany) as a photoluminescent pigment.

Preferably, the photoluminescent pigments used according to the invention comprise an average particle size of 1 to 60 µm, preferably of 5 to 55 µm, more preferably of 10 to 50 µm, still more preferably of 15 to 45 µm and most preferably of 20 to 40 µm.

The term "particle size" refers to the size of the primary particles, wherein in round or almost round particles this information relates to the diameter, while in irregularly shaped, for example needle-shaped, particles said information relates to the longest axis. The particle size will be selected by the average person skilled in the art depending on the desired characteristics of the coating. It depends, for example, also on the desired coating thickness. As a rule, in the case of a thin coating the average person skilled in the art will select smaller particles.

The content of the photoluminescent pigment used according to the invention can vary in a wide range, but it should be in a range in which the desired afterglow is achieved. In some embodiments the proportion of the photoluminescent pigment is at most 50 per cent by weight, more preferably at most 45 per cent by weight, in each case relative to the total weight of the non-cured coating composition.

Furthermore, the photoluminescent pigment should be added in quantities so that adequate brightness of afterglow is obtained. Preferably, for this reason the proportion of the photoluminescent pigments ranges from at least 20 per cent by weight, preferably from at least 25 per cent by weight, in each case relative to the total weight of the non-cured coating composition.

Particular embodiments therefore comprise 20 to 50 per cent by weight, more preferably 25 to 45 per cent by weight and most preferably 25 to 35 per cent by weight of the photoluminescent pigment, in each case relative to the total weight of the non-cured coating composition.

In particular embodiments of the present invention the afterglow coating comprises the photoluminescent pigment at a weight ratio of 20:80 to 50:50 relative to the clear varnish, more preferably at a weight ratio of 25:75 to 45:55 to the clear varnish, and most preferably at a weight ratio of 25:75 to 35:65 to the clear varnish.

The afterglow coating of the present invention has been set in such a manner that the photoluminescent pigments absorb light energy in a wavelength range from 150 to 500 nm and emit light in a wavelength range from 450 to 550 nm (peak value). In particular, the photoluminescent pigments emit light energy in a wavelength range from 200 to 450 nm and emit light in a wavelength range from 480 to 500 nm (peak value) and still more preferably at a wavelength of 490 nm (peak value).

In preferred embodiments of the present invention the colour of the afterglow coating according to the invention appears whitish to yellowish to the human eye. In a particularly preferred embodiment the afterglow colour of the coating according to the invention appears whitish to the human eye. In a further particularly preferred embodiment the afterglow colour of the coating according to the invention appears white to the human eye.

The afterglow coating of the present invention comprises an afterglow duration of at least 6 hours, preferably of at least 8 hours, more preferably of at least 10 hours, and most preferably of at least 12 hours. In this arrangement the afterglow density 60 minutes after activation with ambient illumination of 25 lx (lux) and an activation period of 1 hour is at least 3 mcd/m$^2$, preferably at least 5 mcd/m$^2$, more preferably at least 7 mcd/m$^2$ and most preferably at least 9 mcd/m$^2$ (mcd=millicandela).

Generally speaking, in the production of the coating according to the invention, a clear varnish can be mixed with the photoluminescent pigment and if applicable with further additives, e.g. generally known fillers, plasticisers, flow modifying agents, adhesion improving agents, hardeners, thinners, antioxidants or light protection agents, so that even distribution of the photoluminescent pigment in the clear varnish takes place. This mixture can then if applicable be applied to a surface and can be cured to form a coating.

The afterglow coating according to the invention can, for example, be applied to metal, ceramic, plastic, glass or wood, wherein it is possible that this clear varnish or some other coating composition has already been applied to the surfaces of the aforesaid. The afterglow coating according to the invention is particularly suitable on pre-painted steel materials or plastic materials. The coating according to the invention is preferably suitable for use on substrates in cabins of aircraft, but it can also be used for other purposes, e.g. for other means of transport such as cars, or for theatres, cinemas, cellar rooms etc.

In this arrangement the afterglow coating of the present invention can be applied all over on a large area, e.g. walls, floors and/or ceilings. However, it is also possible to coat individual regions, e.g. to mark escape routes, or to create other visual effects, with the afterglow coating.

In particular embodiments the afterglow coating of the present invention is directly applied to an untreated surface.

In other embodiments the afterglow coating is applied to a pre-treated surface, e.g. a primed or pre-painted surface, in order to improve adhesion of the afterglow coating.

The afterglow coating of the present invention can be applied in any form that ensures that the coating coats the surface of the support material in the desired manner; e.g. the coating can be applied to the surface conventionally by spraying or by means of a brush. In a further embodiment the afterglow coating of the present invention is applied, together with other colour particles, to a surface by means of a spatula technique or palette knife technique in order to produce a visual surface in the manner of a marbled surface. To this effect the ratio of photoluminescent pigments should preferably range from 30 to 50 per cent by weight relative to the overall weight of the non-cured coating composition.

Curing or drying of the afterglow coating on the surface to be coated can take place in the usual manner at room temperature or at increased temperatures for an adequate period of time. At room temperature, complete curing of the coating usually takes place within a period of time of 6 to 8 days (e.g. 20° C. and 60 per cent relative atmospheric humidity). In another embodiment, curing of the afterglow coating takes place at a temperature of 60° C. within a period of time of 1 to 4 hours.

The thickness of the dry afterglow coating e.g. with 30 per cent by weight of pigment can finally range from 15 to 200 μm, more preferably from 20 to 140 μm and most preferably from 40 to 80 μm.

Below, examples of advantageous embodiments of the coating according to the invention are stated, with the percentages indicated as % by weight relative to the overall weight of the non-cured coating composition.

EXAMPLE 1

A clear varnish, ALEXIT® FST clear varnish 404-15 of Firma Mankiewicz Gebr. & Co (GmbH & Co. KG) (Germany), is mixed with 30 per cent by weight of a photoluminescent pigment of a white luminous colour (LL PBL 35-W of Longlite Technologies (Germany)). Thereafter the coating is applied to a surface and is cured.

EXAMPLE 2

The afterglow density of the photoluminescent pigment used in Example 1 has been determined according to DIN-regulation 67510 part 1. Accordingly, the afterglow density is measured 60 minutes after activation with ambient light of 25 lx (lux) and an activation period of 1 hour. The following Table I shows the corresponding afterglow densities at various points in time.

Table I:

| Time [min] | Afterglow density according to Example 2 [mcd/m$^2$] |
|---|---|
| 0 | 2697 |
| 1 | 475 |
| 5 | 131 |
| 10 | 67 |
| 20 | 32 |
| 30 | 21 |
| 40 | 15 |
| 50 | 12 |
| 60 | 10 |

The invention is not limited to the exemplary embodiments described above. It is, for example, possible to use another clear varnish or other photoluminescent pigments.

The invention claimed is:

1. An afterglow coating comprising:
a clear varnish and a photoluminescent pigment,
wherein the pigment comprises a white or whitish afterglow color and is distributed in the clear varnish, and
wherein the photoluminescent pigment is a mixture of at least two alkaline earth aluminates consisting of $MeAl_2O_4$:Eu, wherein Me is an alkaline earth metal selected from the group consisting of calcium, magnesium, strontium and barium.

2. The coating of claim 1, wherein the clear varnish is selected from the group consisting of single-component (1K), two-component (2K) or multi-component (3K, 4K) clear varnishes, clear powder varnishes, powder-slurry clear varnishes, UV-curable clear varnishes and liquid clear varnishes.

3. The coating of claim 1, wherein the clear varnish is selected from the group consisting of varnishes based on acrylic polymers, modified acrylic polymers, polyesters, polyepoxides, polycarbonates, polyurethanes, polyamides, polyimides, polysiloxanes and mixtures thereof.

4. The coating of claim 1, wherein the photoluminescent pigments absorb light energy in a wavelength range from 100 to 500 nm.

5. The coating of claim 1, wherein the photoluminescent pigments emit light energy in a wavelength range from 450 to 550 nm.

6. The coating of claim 1, wherein the photoluminescent pigment comprises an average particle size from 1 to 60 μm.

7. The coating of claim 1, wherein the photoluminescent pigment is present at a weight ratio of 20:80 to 50:50 relative to the clear varnish.

8. The coating of claim 1, wherein a thickness of the dry afterglow coating ranges from 15 to 200 μm.

9. The coating of claim 1, wherein the coating has an afterglow duration of at least 6 hours.

10. The coating of claim 1, wherein the coating has an afterglow density of at least 3 mcd/m$^2$.

11. An article of manufacture comprising an afterglow coating, wherein the afterglow coating comprises a clear varnish and a photoluminescent pigment, wherein the pigment comprises a white or whitish afterglow color and is distributed in the clear varnish, wherein the photoluminescent pigment is a mixture of at least two alkaline earth aluminates comprising consisting of MeAl2O4:Eu, wherein Me is an alkaline earth metal selected from the group consisting of calcium, magnesium, strontium and barium, and wherein the article of manufacture comprises a material selected from the group consisting of metal, ceramic, plastic, molded plastic, glass, and wood.

12. An aircraft comprising at least one surface in a cabin of the aircraft, wherein the surface comprises an afterglow coating, and wherein the afterglow coating comprises a clear varnish and a photoluminescent pigment, wherein the pigment comprises a white or whitish afterglow color and is distributed in the clear varnish; and wherein the photoluminescent pigment is a mixture of at least two alkaline earth aluminates comprising consisting of MeAl2O4:Eu, wherein Me is an alkaline earth metal selected from the group consisting of calcium, magnesium, strontium and barium.

* * * * *